(12) United States Patent
Wulff et al.

(10) Patent No.: US 7,607,409 B2
(45) Date of Patent: Oct. 27, 2009

(54) CARBIDE SUPERCELL FOR DRY ACETYLENE GENERATION AND AN INTERNAL COMBUSTION ENGINE USING THE SAME

(76) Inventors: Joseph W. Wulff, Route 1, Box 8601, Hwy. HH, Hallsville, MO (US) 65255; Harry J. Wulff, 605 Rockhill Rd., Columbia, MO (US) 65201

( * ) Notice: Subject to any disclaimer, the term of this patent is extended or adjusted under 35 U.S.C. 154(b) by 245 days.

(21) Appl. No.: 11/767,335

(22) Filed: Jun. 22, 2007

(65) Prior Publication Data

US 2007/0295288 A1    Dec. 27, 2007

Related U.S. Application Data

(60) Provisional application No. 60/815,742, filed on Jun. 22, 2006.

(51) Int. Cl.
*F02B 43/10* (2006.01)
*F02M 15/00* (2006.01)

(52) U.S. Cl. ................... 123/3; 123/541; 48/34

(58) Field of Classification Search ........... 123/1 A, 123/3, 525, 527, 541; 48/34
See application file for complete search history.

(56) References Cited

U.S. PATENT DOCUMENTS

| | | | |
|---|---|---|---|
| 662,258 A | 11/1900 | Dickerson | |
| 1,496,810 A | 6/1924 | Keyes | |
| 2,502,990 A | 4/1950 | Rathbun | |
| 2,535,227 A * | 12/1950 | Ott | 48/38 |
| 2,925,385 A | 2/1960 | Wolfram et al. | |
| 3,498,767 A * | 3/1970 | Foster | 48/38 |
| 3,664,134 A | 5/1972 | Seitz | |
| 3,753,424 A | 8/1973 | Haidvogel | |
| 3,799,124 A | 3/1974 | Swain | |
| 3,982,391 A | 9/1976 | Reynolds | |
| 4,054,423 A | 10/1977 | Blenman | |
| 4,140,090 A | 2/1979 | Lindberg | |
| 4,279,619 A | 7/1981 | Tsuzuki et al. | |
| 4,327,675 A | 5/1982 | Takeda | |

(Continued)

FOREIGN PATENT DOCUMENTS

BE    470235    1/1947

(Continued)

OTHER PUBLICATIONS

JW. Rose, and J.R. Cooper. Technical Data On Fuels. Seventh Edition. Halsted Press Book. New York: John Wiley & Sons, 1977. Pg. various tables throughout. Month unavailable.

(Continued)

*Primary Examiner*—Hai H Huynh
(74) *Attorney, Agent, or Firm*—Lathrop & Gage LLP

(57) ABSTRACT

Novel carbide supercells for dry acetylene generation are disclosed herein, along with methods of use and internal combustion engines incorporating the carbide supercells. A carbide supercell according to one embodiment includes an outer shell defining an interior gas chamber and a rotating basket positioned in the gas chamber. The basket defines a plurality of holes and is configured to contain at least one calcium carbide rock. An injector is adjacent the basket for spraying a liquid into the basket, and a controller is in data communication with the injector for actuating the injector. A chamber outlet is adjacent an upper end of the gas chamber.

30 Claims, 7 Drawing Sheets

U.S. PATENT DOCUMENTS

| | | |
|---|---|---|
| 4,333,739 A | 6/1982 | Neves |
| 4,372,753 A | 2/1983 | Narasimhan, Jr. et al. |
| 4,384,551 A | 5/1983 | Scott |
| 4,398,921 A | 8/1983 | Rifkins et al. |
| 4,444,159 A | 4/1984 | Earl |
| 4,603,662 A | 8/1986 | Norton |
| 4,647,288 A | 3/1987 | Dillon |
| 4,757,787 A | 7/1988 | Risitano |
| 4,884,533 A | 12/1989 | Risitano |
| 4,945,863 A | 8/1990 | Schmitz et al. |
| 4,960,089 A | 10/1990 | Kond et al. |
| 5,266,083 A | 11/1993 | Peter-Hoblyn et al. |
| 5,771,873 A | 6/1998 | Potter et al. |
| 6,076,487 A | 6/2000 | Wulff et al. |
| 6,196,204 B1 | 3/2001 | Janach |
| 6,287,351 B1 | 9/2001 | Wulff et al. |
| 6,575,147 B2 | 6/2003 | Wulff et al. |

FOREIGN PATENT DOCUMENTS

| | | |
|---|---|---|
| DE | 132362 | 6/1902 |
| FR | 559303 | 9/1923 |
| FR | 649213 | 12/1928 |
| FR | 868777 | 1/1942 |
| FR | 875852 | 10/1942 |
| FR | 886908 | 10/1943 |
| FR | 2542006 | 9/1984 |
| JP | 56027029 | 3/1981 |
| JP | 57068521 | 4/1982 |
| JP | 02102327 | 4/1990 |
| JP | 06313178 | 11/1994 |
| JP | 10141068 | 5/1998 |

OTHER PUBLICATIONS

Kenneth Wark, Cecil F. Warner, and Wayne T. Davis. Air Pollution Its Origin And Control. Third Edition. Addison-Wesley. p. 517-525. Date unavailable.

Katsumi Kataoka, Computational Estimaiton of the Performance of a SI Engine w/ Various Fuels, Nippor Kikkal Gakkal Ronbunshu, B Hen., v56, n523, Mar. 1990, pp. 830-835, Japan. cited by other.

J.E. Sinor Consultants, Acetylene Could Be Synthetic Fuel For Transportation, Sinor Synthetic Fuels Report, vol. 8, No. 1, Jan. 2001, USA. http://edj.net/sinor/sfr1-01art2.html. cited by other.

International Search Report for PCT/US01/40333 issued on related application of the present application, European Patent Office as International Search Authority, issued Jun. 5, 2002, citing foreign applications for which English abstracts are not available.

International Search Report for PCT/US06/21206 issued on related application of the present application, European Patent Office as International Search Authority, issued Oct. 12, 2006 citing foreign applications for which English abstracts are not available.

\* cited by examiner

CARBIDE SUPERCELL FOR DRY ACETYLENE GENERATION AND AN INTERNAL COMBUSTION ENGINE USING THE SAME

RELATED APPLICATIONS

The present application claims benefit of priority to provisional U.S. Patent Application No. 60/815,742, filed Jun. 22, 2006 and titled "Carbide Supercell For Dry Acetylene Generation And An Internal Combustion Engine Using The Same", which is incorporated herein by reference.

BACKGROUND

As disclosed in my earlier patents, U.S. Pat. Nos. 6,076,487; 6,287,351; 6,575,147; and 7,093,567; and my allowed patent application, U.S. patent application Ser. No. 09/532,118, acetylene may be used to power internal combustion engines. As noted in those references, acetylene may provide many benefits, including environmental benefits and supply benefits.

Acetylene is traditionally produced from calcium carbide and water by submerging calcium carbide into large volumes of water, which creates a slurry byproduct that is generally unusable without additional processing and that is not environmentally friendly. The current invention relates generally to improved acetylene production.

SUMMARY

Novel carbide supercells for dry acetylene generation are disclosed herein, along with methods of use and internal combustion engines incorporating the carbide supercells. A carbide supercell according to one embodiment includes an outer shell defining an interior gas chamber and a rotating basket positioned in the gas chamber. The basket defines a plurality of holes and is configured to contain at least one calcium carbide rock. An injector is adjacent the basket for spraying a liquid into the basket, and a controller is in data communication with the injector for actuating the injector. A chamber outlet is adjacent an upper end of the gas chamber.

A method of producing acetylene according to an embodiment includes the steps: (a) providing a carbide supercell that has an outer shell defining an interior gas chamber, a rotating basket positioned in the gas chamber (the basket defines a plurality of holes and is configured to contain at least one calcium carbide rock), an injector adjacent the basket for spraying a liquid including water into the basket, a controller in data communication with the injector for actuating the injector, a chamber outlet adjacent an upper end of the gas chamber, and means for cooling a gas; (b) providing at least one calcium carbide rock in the basket; (c) rotating the basket; (d) having the injector spray the liquid into the basket to create a chemical reaction resulting in the production of acetylene gas and calcium hydroxide dust; (e) passing the calcium hydroxide dust through the basket holes to deposit substantially dry calcium hydroxide dust below the basket in the gas chamber; (f) passing the acetylene gas through the chamber outlet; and (g) cooling the acetylene gas using the means for cooling.

An internal combustion engine according to an embodiment includes a supercell and a cylinder having a fuel input device and an exhaust valve. A controller is in data communication with the fuel input device and the exhaust valve. A piston and a spark plug are located within the cylinder. The supercell has an outer shell defining an interior gas chamber, a rotating basket positioned in the gas chamber, an injector adjacent the basket for spraying a liquid into the basket, a chamber outlet adjacent an upper end of the gas chamber, and means for cooling gaseous acetylene. The basket defines a plurality of holes, and the chamber outlet is in communication with the fuel input device.

DETAILED DESCRIPTION

Figure 1:
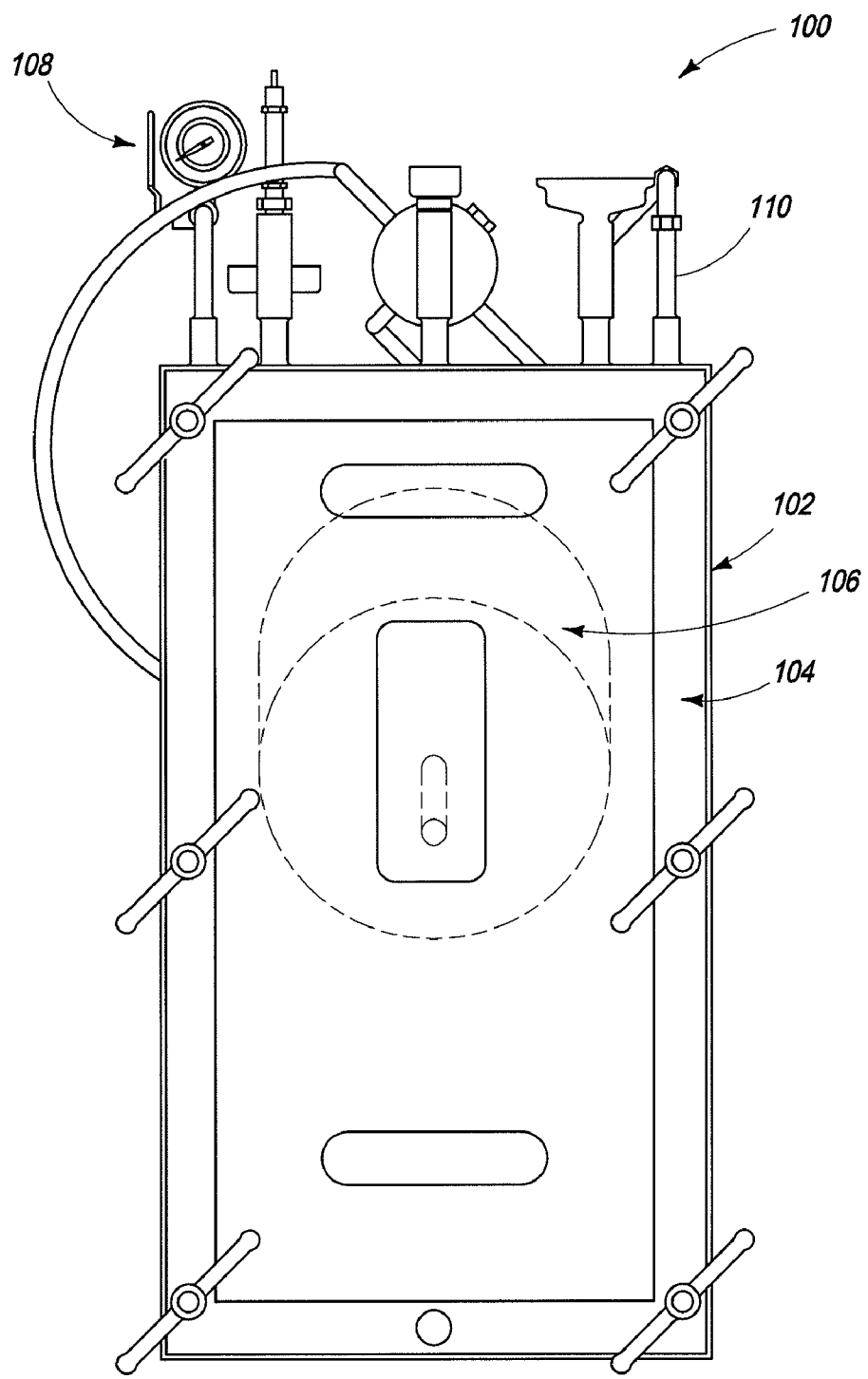
FIG. 1 is a front view of a carbide supercell according to an embodiment disclosed herein.

FIG. 1 is a front view of a carbide supercell 100. As discussed below, the carbide supercell 100 may be used with an internal combustion (I.C.) engine that is designed or modified to be at least partially powered from acetylene, the supercell 100 may provide acetylene to a storage tank or another device that uses or stores acetylene, or the supercell 100 may be otherwise used as appropriate. It should be understood that the appearance of the carbide supercell 100 may be changed in many respects, including shape and size, and that the principles of operation described herein are of primary importance. The carbide supercell 100 is shown to have an outer shell 102, a door 104 coupled to the outer shell 102, a rotating basket 106 inside the outer shell 102, a plurality of instruments 108 atop the outer shell 102, and outlet tubing (or "feed tubing") 110. Each of these elements are described below.

Figure 2:
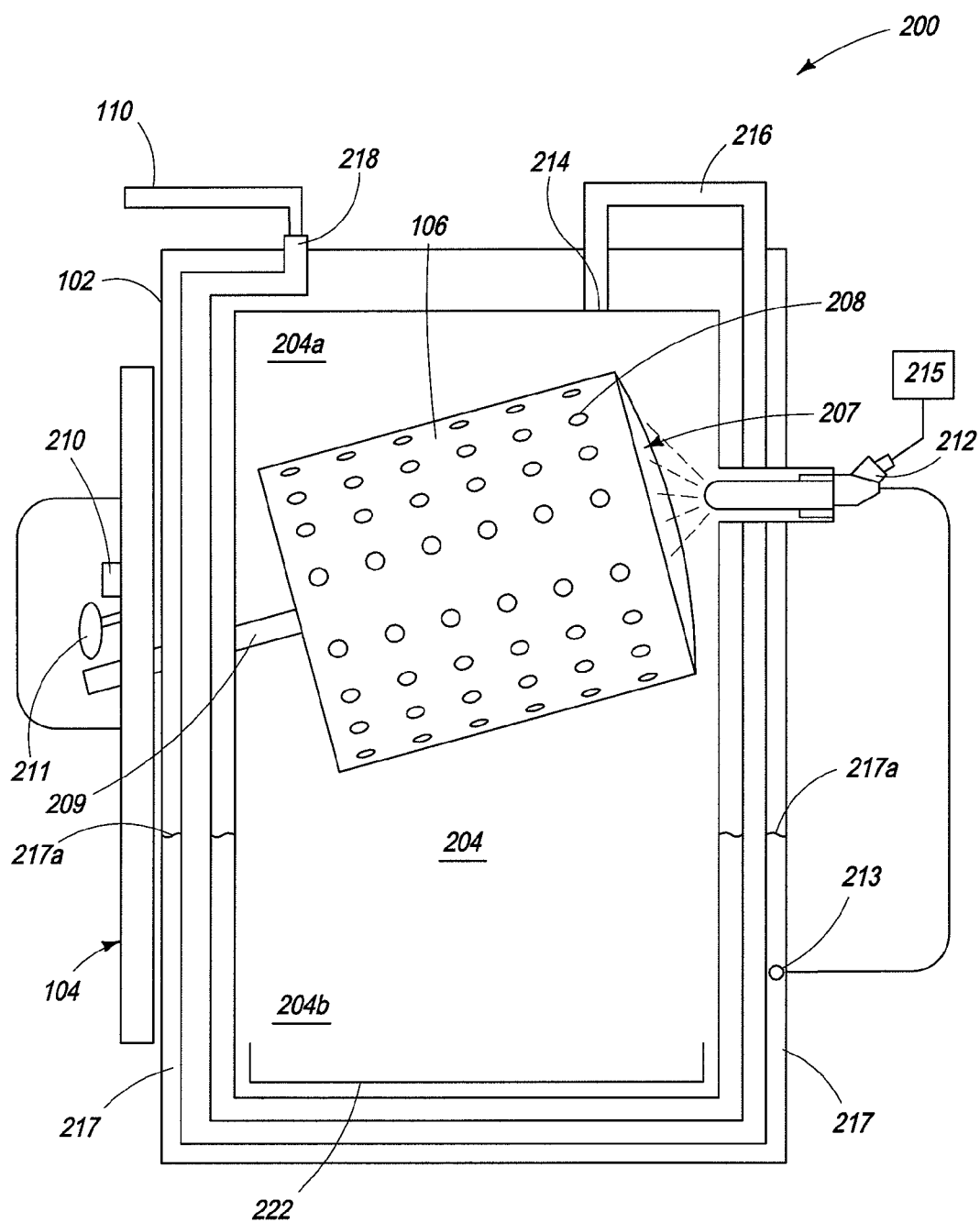
FIG. 2 is a sectional side view of a carbide supercell according to an embodiment disclosed herein.

FIG. 2 is a sectional side view of a carbide supercell 200 similar to that shown in FIG. 1. The outer shell 102 defines an interior gas chamber 204, and the rotating basket 106 is positioned inside the gas chamber 204. The basket 106 may define an open interior region 207 and include a plurality of holes 208 (e.g., holes having ½ inch diameter, ⅛ inch diameter, 1/16 inch diameter, or another diameter). The basket 106 may be mounted at an angle by a shaft 209, as shown; it is currently preferred that the basket 106 is mounted from about 45 degrees to about 65 degrees from the horizon, though other angles (including but not limited to zero degrees) may also be appropriate. The angle of the basket 106 may prevent the basket's contents from falling from the basket 106 during rotation. To rotate the basket 106, the shaft 209 is powered by a motor 210, power output from the internal combustion engine, and/or another power source. Gearing 211 is schematically shown to connect the motor 210 to the shaft 209, though belts or other appropriate devices may alternately be used. The basket 106 may either remain in constant motion when the supercell 100 is in use, or the basket 106 may be rotated intermittently.

An injector 212 may be adjacent the basket 106, and as shown in FIG. 2, the injector 212 may be positioned to spray a liquid (i.e., water or a water-alcohol mixture) into the basket's open interior region 207. The injector 212 is in data communication with a controller 215 and a pump 213; the controller 215 controls the frequency and/or amount of spray by the injector 212. As discussed below, if the supercell 100 is used with an internal combustion engine, the controller 215 may be the same controller that the engine uses for fuel injection, though this is not required.

The supercell 100 shown in FIG. 2 has a chamber outlet 214 located at an upper end 204a of the interior gas chamber 204, and tubing 216 extends from the chamber outlet 214 to a water or water-alcohol jacket 217 that at least partially surrounds the chamber 204. The fluid level of the water or water-alcohol jacket 217 is represented by numerals 217a, though it should be appreciated that the fluid level could be different and can fluctuate. While the jacket 217 is referred to herein as a "water jacket" or a "water-alcohol jacket", it should be appreciated that other substances may also be used.

A supercell outlet 218 may be in communication with the tubing 216 (as shown in FIG. 2,) or with the jacket 217 if the tubing does not extend from the chamber outlet 214 to the supercell outlet 218, as will be discussed in relation to FIG. 3. Feed tubing 110 may connect the supercell outlet 218 to a fuel intake of an internal combustion engine, for example. The feed tubing 110 may alternately connect the supercell outlet 218 to an acetylene storage tank or another device that uses or stores acetylene. The liquid in the jacket 217 may be in communication with the injector 212 so that the injector 212 sprays liquid from the water or water-alcohol jacket 217. By limiting the number of liquid reservoirs, the overall weight of the supercell 100 may be minimized; depending on the application, weight may or may not be an important consideration. While the drawings show the pump 213 in communication with the liquid in the jacket 217, this is not required in all embodiments. Further, the chamber outlet 214 may serve as the supercell outlet 218 and the jacket 217 may be eliminated if cooling the acetylene inside the supercell is not a concern.

A dust collection pan 222 may be located at a lower lend 204b of the interior gas chamber 204. The dust collection pan 222 (and the interior gas chamber 204) may be accessible through the door 104 of the outer shell 102. The basket 106 may be operatively coupled to the door 104 so that removal of the basket 106 is facilitated for cleaning, for example. It should be appreciated, however, that the basket 106 may alternately be permanently coupled to the shell 102 and that the injector 212, for example, may be coupled to the door 104.

In use, calcium carbide rocks may be positioned in the open interior region 207 of the basket 106 (e.g., manually by removing the door 104, or by using an automated mechanical input system such as an auger as discussed below). The motor 210 may turn the shaft 209 to rotate the basket 106, and the rotation of the basket 106 may tumble the calcium carbide rocks, performing a scaling (cleaning) function on the calcium carbide rocks. The controller 215 may actuate the injector 212 to spray the liquid into the basket's open interior region 207 and on the calcium carbide rocks, causing a chemical reaction and the production of acetylene. The scaling of the calcium carbide rocks produces a dust that may pass through the holes 208 in the basket 106 and fall onto the dust collection pan 222. The dust may be collected for use in the agricultural industry, for example, and though not shown, a mechanical device such as an auger may remove the calcium oxide dust from the pan 222 and the chamber 204. Multiple baskets 106 with holes 208 may be nested inside one another to suspend the dust longer and obtain an increased acetylene production.

The acetylene produced in the chemical reaction may pass out the chamber outlet 214, through the tubing 216, and out the supercell outlet 218. The acetylene may be cooled by passing through the water or water-alcohol jacket 217 in the tubing 216, and using a tubing 216 that has low insulative properties may help in cooling the acetylene. The jacket 217 may additionally or alternately cool the chamber 204, as maintaining a cool temperature in the chamber 204 may speed up acetylene production and keep acetylene in the chamber 204 from decomposing.

As discussed above, the injector 212 may spray liquid from the jacket 217. If the jacket 217 includes a water-alcohol mixture, the alcohol would not contribute to the chemical reaction and the production of acetylene. The alcohol could provide various benefits, however. For example, the alcohol could act as an antifreeze and keep the supercell from freezing in cold weather. The alcohol could also mix with the produced acetylene and travel out the chamber outlet 214, through the tubing 216, and out the supercell outlet 218; as noted in some of my earlier patents listed above, it may be advantageous to power an internal combustion engine with an acetylene/alcohol mixture.

While it should be appreciated that supercells 200 of different capacities may be appropriate for different uses, it may be particularly advantageous to utilize an array of supercells 200 assembled in parallel. Such an array may allow maintenance to be performed on one supercell 200 without a severe loss of acetylene production.

Though not shown in FIG. 2, the instruments 108 shown in FIG. 1 could be used to provide various data about the supercell 200. For example, the instruments 108 could provide temperature of the acetylene exiting the supercell outlet 218, temperature of the jacket 217, temperature in the chamber 204, pressure in the chamber 204, fluid level of the jacket 217, volume of acetylene exiting the supercell outlet 218, and/or other data.

A supercell 200 has been constructed and tested with positive results. The supercell outlet 110 was connected to a fuel intake of an internal combustion engine, and the controller 215 was the same controller that the internal combustion engine used for fuel injection. As such, the supercell 200 generated only the amount of acetylene required by the engine at idle or under various loads. The calcium hydroxide dust produced from the chemical reaction and the scaling process was suitable for use (e.g., in the agricultural field) directly from the supercell 200.

Figure 3:
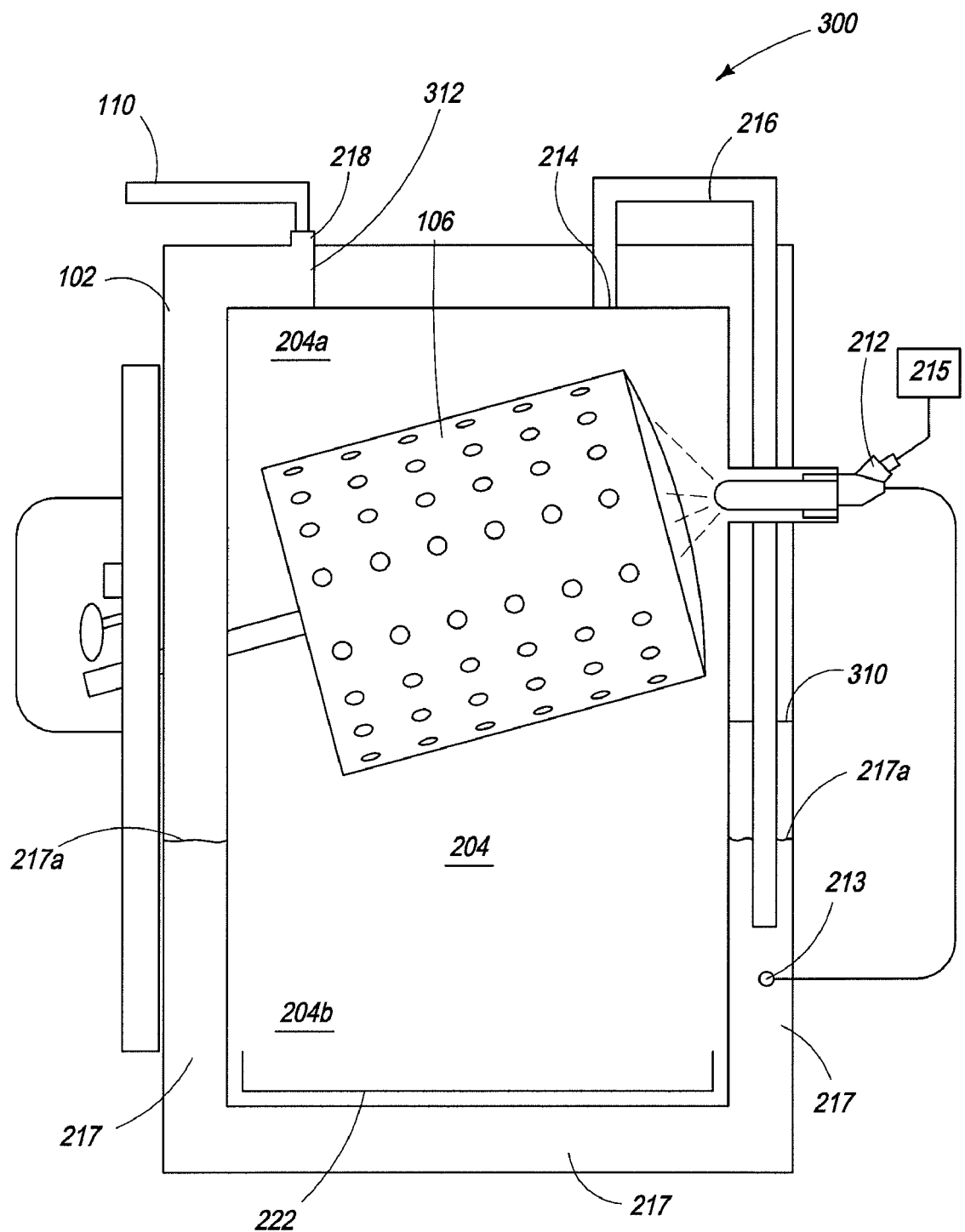
FIG. 3 is a sectional side view of a carbide supercell according to an embodiment disclosed herein.

FIG. 3 is a sectional side view of a carbide supercell 300 similar to that shown in FIG. 2. The difference between the carbide supercell 300 and that shown in FIG. 2 is the path of travel from the chamber outlet 214 to the supercell outlet 218. In the supercell 300, the tubing 216 does not extend from the chamber outlet 214 to the supercell outlet 218. Instead, the tubing 216 ends in the jacket 217. This configuration may provide better cooling for the acetylene exiting the chamber outlet 214 and may allow additional alcohol to exit the supercell outlet 218 along with the acetylene (if the jacket 217 includes alcohol). Additionally, the jacket 217 may act as a backflash arrestor to protect the contents of the gas chamber 204. While the tubing 216 is shown ending before the pump 213, it should be appreciated that the tubing could end at various points inside the jacket 217. Walls 310, 312 are shown in FIG. 3 to keep the acetylene from exiting the supercell outlet 218 without first passing through the jacket 217. Placement of the walls 310, 312 can of course be varied.

Figure 4:
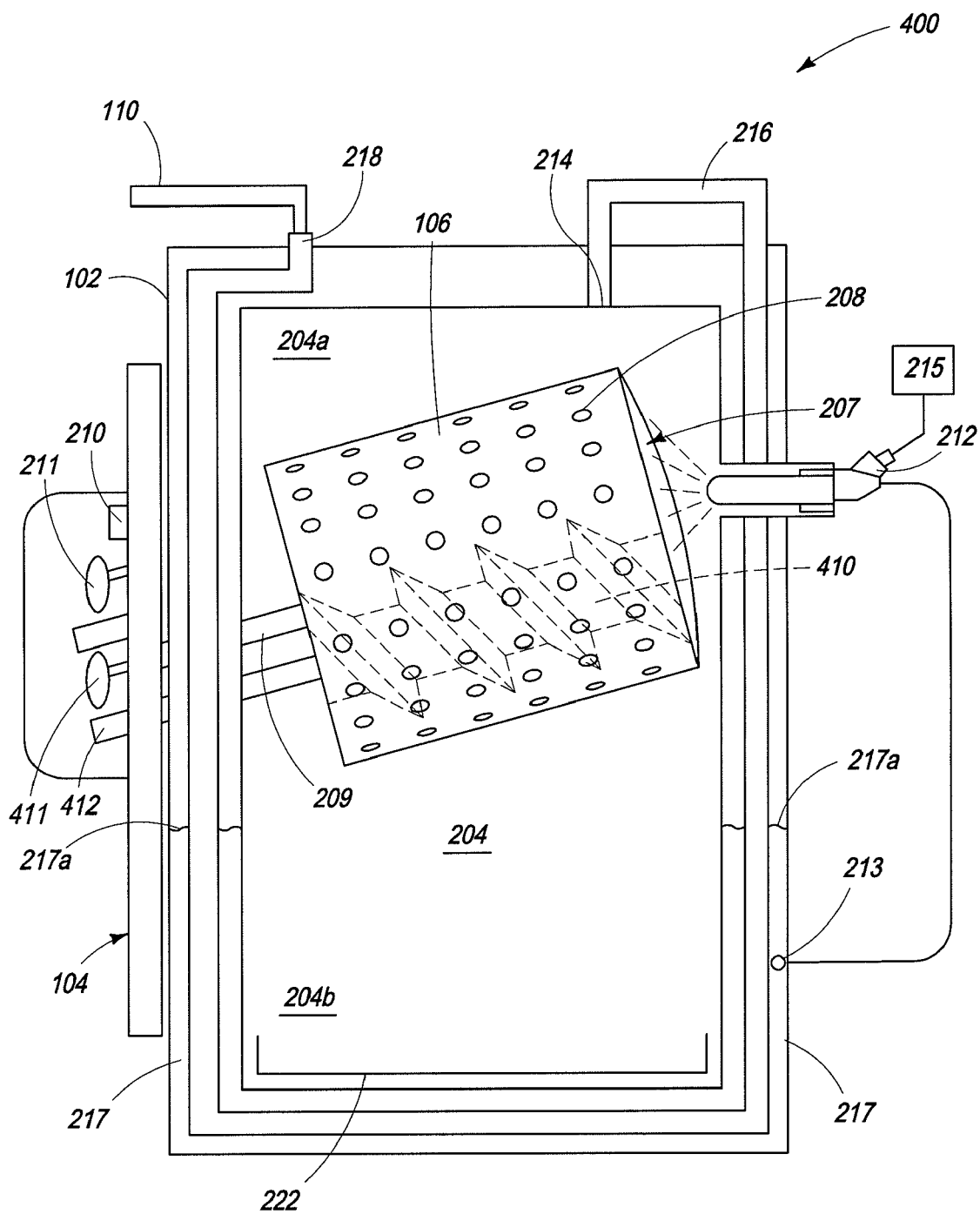
FIG. 4 is a sectional side view of a carbide supercell according to an embodiment disclosed herein.

FIG. 4 is a sectional side view of a carbide supercell 400 similar to that shown in FIG. 2. The difference between the carbide supercell 400 and that shown in FIG. 2 is that the supercell 400 includes an auger 410 which may be incorporated into any of the supercells disclosed herein. The auger 410 is positioned inside the basket 106 to agitate or stir the contents of the basket 106 (i.e., calcium carbide rocks) and may be various sizes and shapes. The auger 410 may be coupled to a shaft 412 which is powered by the motor 210, power from the internal combustion engine, and/or another power source. Along with the gearing 211, gearing 411 is schematically shown to connect the motor 210 to the shaft 412, though belts or other appropriate devices may alternately be used. The shaft 410 may rotate in a direction opposite that of the shaft 209 to better agitate the contents of the basket 106. While the auger shaft 412 is shown to be below the shaft 209, it may be inside the shaft 209 to facilitate complete rotation of both the basket 106 and the auger 410. Though not specifically shown in the drawings, the auger 410 may extend outside the chamber 204 or to a supply location within the chamber 204 and supply the basket 106 with calcium carbide rocks. Such a configuration could minimize the frequency of which the door 104 is removed from the shell 102.

Figure 5:
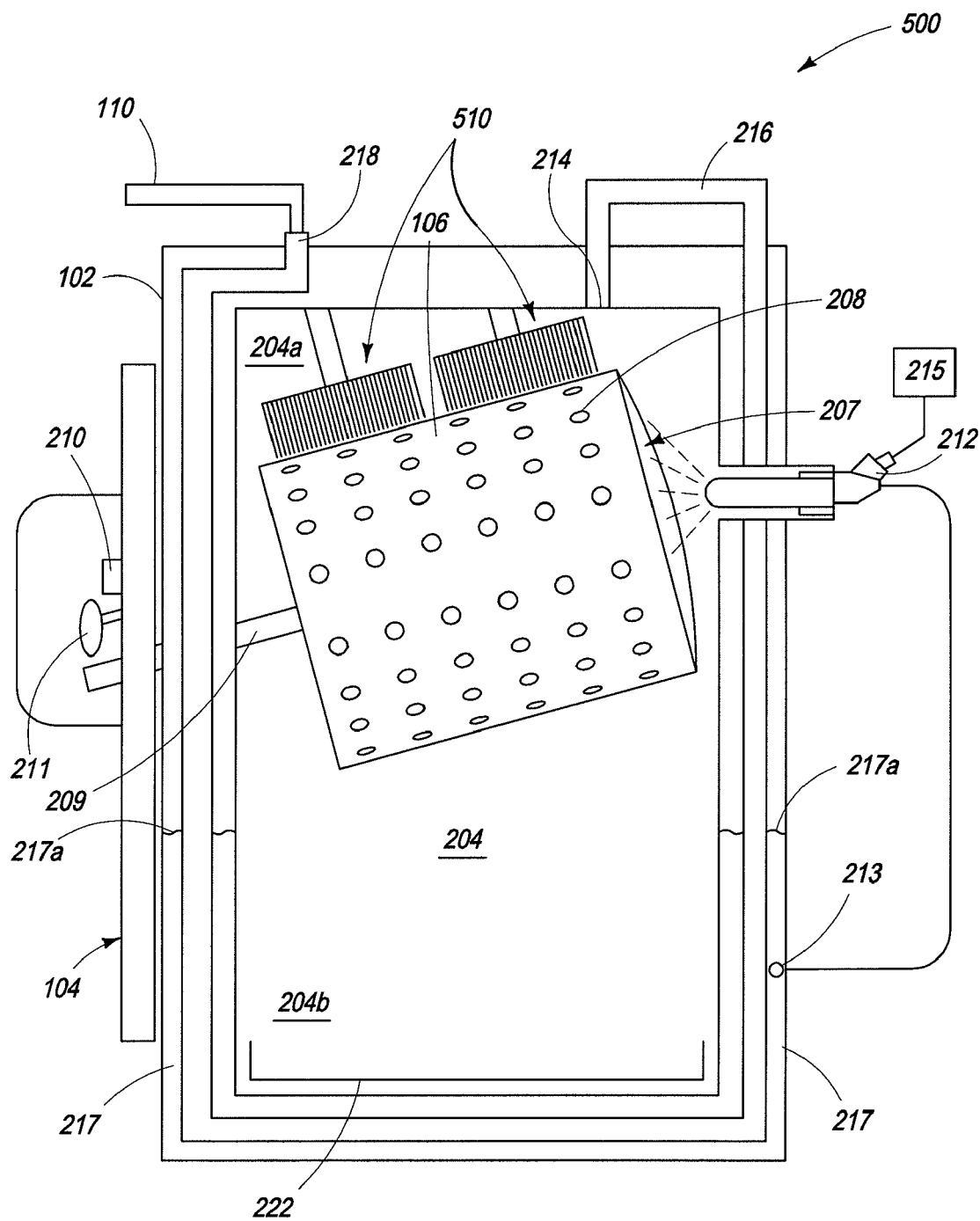
FIG. 5 is a sectional side view of a carbide supercell according to an embodiment disclosed herein.

FIG. 5 is a sectional side view of a carbide supercell 500 similar to that shown in FIG. 2. The difference between the carbide supercell 500 and that shown in FIG. 2 is that the supercell 500 includes basket brushes 510 which may be incorporated into any of the supercells disclosed herein. The basket brushes 510 are positioned adjacent the basket 106 to dislodge dust from the holes to allow the dust to pass through the holes 208 in the basket 106 and fall onto the dust collection pan 222. Though the brushes 510 are shown upwardly and outwardly adjacent the basket 106, they may be positioned in alternate configurations, including inside the basket 106. To keep from causing an explosion in the chamber 204, the brushes 510 may need to be constructed of a non-static and non-sparking material.

Figure 6A:
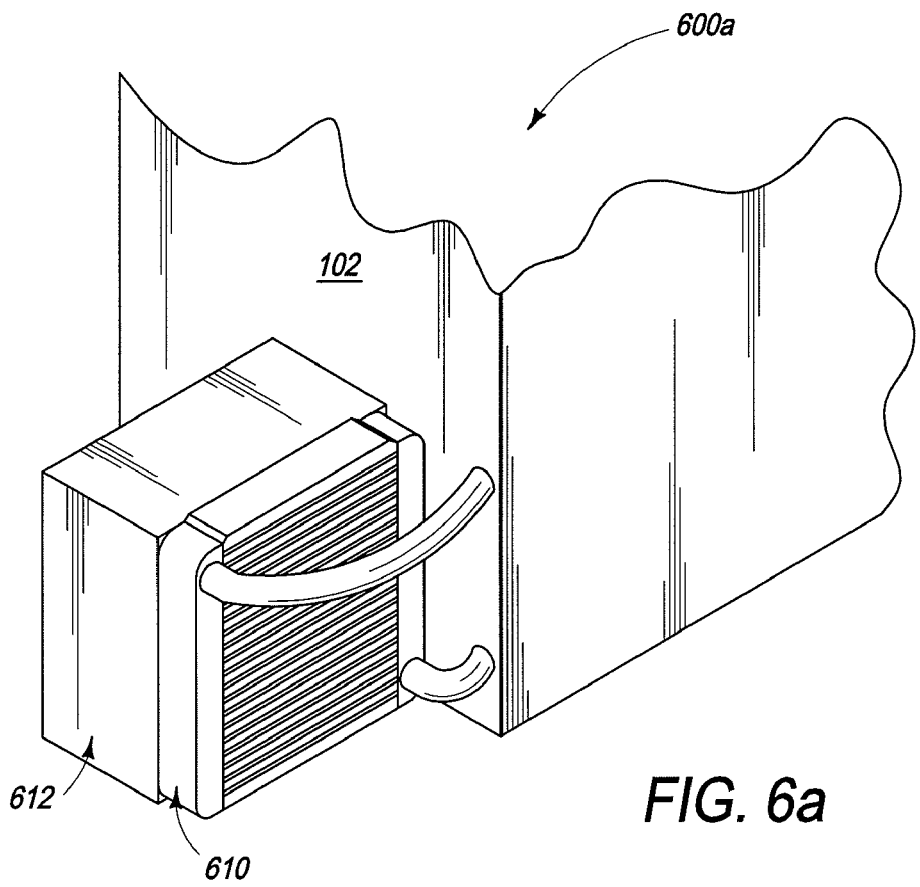
FIG. 6a is a partial perspective view of a side of a carbide supercell according to an embodiment disclosed herein.

FIG. 6a is a partial perspective view of a side of a carbide supercell 600a similar to that shown in FIG. 2. The supercell 600a has a radiator 610 incorporated therein for maintaining cooler temperatures in the chamber 204 and/or the jacket 217. The radiator 610 may utilize R-134a, liquified propane, or any other appropriate refrigerant or radiator fluid and works in a traditional manner. A fan 612 pushes air through the radiator to cool the radiator fluid passing into and coming from the supercell 600a. The radiator 610 may be incorporated into any of the supercells disclosed herein.

Figure 6B:
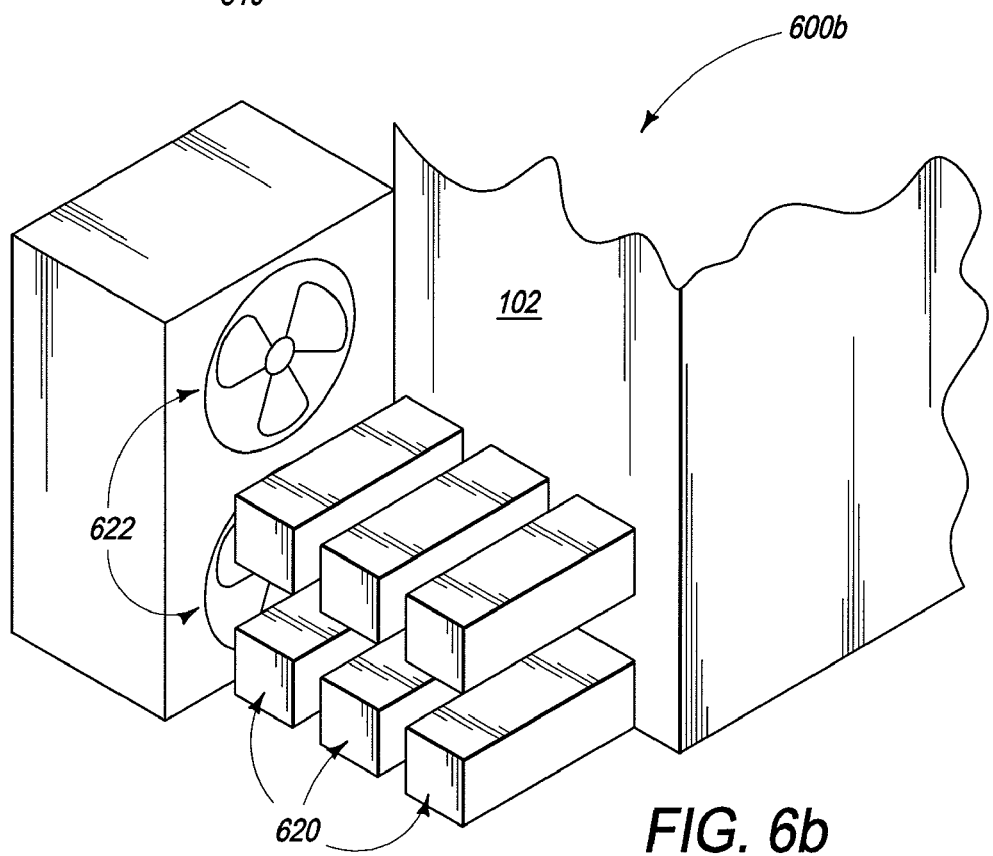
FIG. 6b is a partial perspective view of a side of a carbide supercell according to an embodiment disclosed herein.

FIG. 6b is a partial perspective view of a side of a carbide supercell 600b similar to that shown in FIG. 2. The supercell 600b has a plurality of heat sinks 620 for dissipating heat from the supercell 600b and maintaining cooler temperatures in the chamber 204 and/or the jacket 217. Multiple fans 622 push air across the heat sinks 620 to cool the heat sinks 620. The heat sinks 620 may be incorporated into any of the supercells disclosed herein, and although the heat sinks 620 are depicted as being large, smaller heat fans may have better heat dissipation characteristics.

Figure 7:
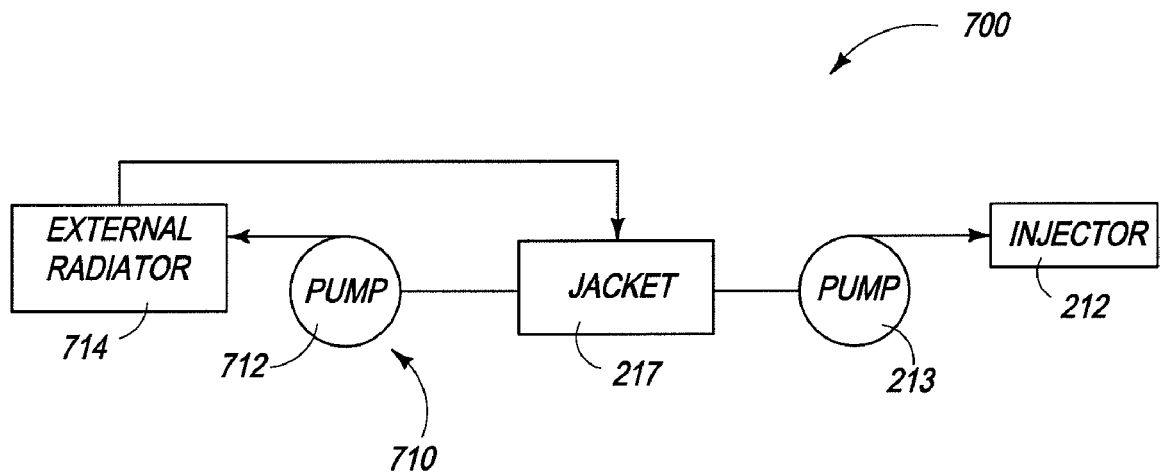
FIG. 7 is a schematic representation of a fluid system for use with a carbide supercell according to an embodiment disclosed herein.

FIG. 7 is a schematic representation of a fluid system 700 for use with any of the supercells disclosed herein. The fluid system 700 includes the water or water-alcohol jacket 217, the pump 213, the injector 212, and a radiator device 710. As noted above, the pump 213 may pump liquid from the jacket 217 to the injector 212. The radiator device 710 has been added in FIG. 7 to ensure that the jacket 217 is cool enough to cool the acetylene inside and outside the chamber 204 as discussed above. Reasons for cooling the acetylene can be found above, as well as in my previous patents.

The radiator device 710 includes a pump 712 and an external radiator 714. The external radiator 714 may use traditional fans and heat fins and/or may utilize an underground reservoir or cool underground air (typically between sixty and sixty-two degrees Fahrenheit), depending on the application of the supercell. The radiator device 710 may also ensure that the fluid level in the jacket 217 is appropriate. To do this, the radiator device 710 may include a fluid-level sensor and a reservoir of fluid to introduce into the jacket 217 if needed.

Figure 8:
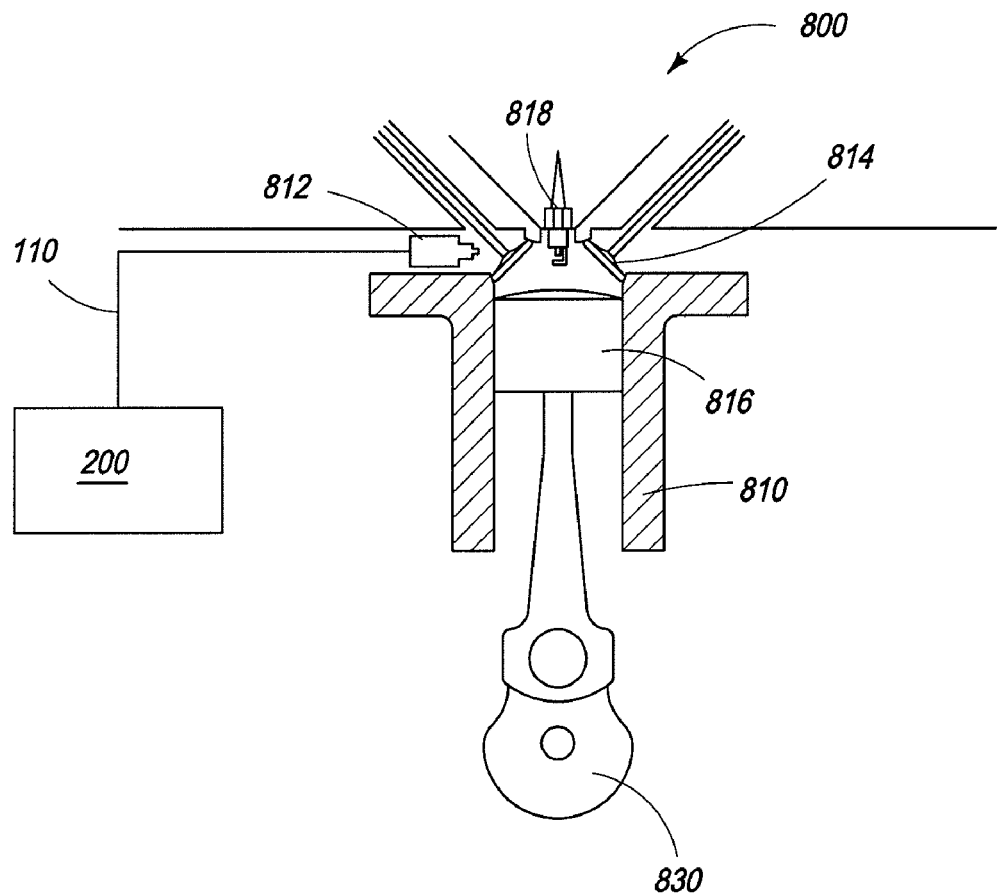
FIG. 8 is a schematic representation of an internal combustion engine utilizing the carbide supercell of FIG. 2, according to an embodiment disclosed herein.

FIG. 8 is a schematic representation of an internal combustion engine 800 utilizing the carbide supercell 200 discussed above, though any of the supercells disclosed above could be used. The engine has a cylinder 810 with a fuel input device 812 (e.g., an intake valve or a fuel injector) and an exhaust valve 814. A piston 816 and a spark plug 818 may be located within the cylinder 810, and a controller (not shown) may be in data communication with the fuel input device 812, the exhaust valve 814, and the spark plug 818 to control the operation of those components. The controller may optionally be the same as the controller 215. The feed tubing 110 provides the acetylene or acetylene/alcohol mixture produced by the supercell 200 as discussed above to the fuel input device 812 for introduction into the cylinder 810 and ignition by the spark plug 818. Ignition causes the piston 816 to move in the cylinder 810 (rotating a crankshaft 830), and the spent fuel is exhausted by opening the exhaust valve 814. Additional discussion of I.C. engines capable of utilizing acetylene can be found in my previous patents and applications noted above, and the information contained therein is incorporated herein by reference. It should be understood that the engine 800 could utilize ignition methods that do not require a spark plug 818, and that such other ignition methods are also contemplated herein.

Those skilled in the art appreciate that variations from the specified embodiments disclosed above are contemplated herein. The description should not be restricted to the above embodiments or the accompanying figures, but should be measured by the following claims.

What is claimed is as follows:

1. A carbide supercell, comprising:
  an outer shell defining an interior gas chamber;
  a rotating basket positioned in the gas chamber, the basket defining an open interior region and a plurality of holes and being configured to contain at least one calcium carbide rock in the open interior region;
  an injector adjacent the basket for spraying a liquid into the open interior region of the basket;
  a controller in data communication with the injector for actuating the injector; and
  a chamber outlet adjacent an upper end of the gas chamber.

2. The supercell of claim 1, further comprising:
  a cooling jacket;
  a supercell outlet; and
  tubing having one end coupled to the chamber outlet and another end coupled to the supercell outlet, the tubing passing through the cooling jacket.

3. The supercell of claim 1, further comprising:
  a cooling jacket;
  a supercell outlet;
  a passageway connecting the chamber outlet to the cooling jacket; and
  a passageway connecting the cooling jacket to the supercell outlet.

4. The supercell of claim 1, further comprising:
a cooling jacket;
a supercell outlet; and
means for directing a gas from the chamber outlet through the cooling jacket and to the supercell outlet.

5. The supercell of claim 4, wherein a pump provides the liquid to the injector from the cooling jacket.

6. The supercell of claim 4, wherein a pump provides the liquid to the injector from a source separate from the cooling jacket.

7. The supercell of claim 4, further comprising a radiator in thermal communication with at least one of the gas chamber and the jacket for cooling purposes.

8. The supercell of claim 4, further comprising at least one heat sink in thermal communication with at least one of the gas chamber and the jacket for cooling purposes.

9. The supercell of claim 4, further comprising a radiator in fluid communication with the cooling jacket for cooling purposes.

10. The supercell of claim 9, wherein the radiator has a portion passing below ground to utilize underground temperatures for cooling.

11. The supercell of claim 9, wherein the radiator includes a reservoir of fluid for introduction into the jacket if a fluid level of the jacket is below a predetermined amount.

12. The supercell of claim 4, wherein the means for directing a gas includes tubing having one end coupled to the chamber outlet and another end coupled to the supercell outlet, the tubing passing through the cooling jacket.

13. The supercell of claim 4, wherein the means for directing a gas includes:
a passageway connecting the chamber outlet to the cooling jacket; and
a passageway connecting the cooling jacket to the supercell outlet.

14. The supercell of claim 4, further comprising means for cooling the cooling jacket.

15. The supercell of claim 14, wherein:
a pump provides the liquid to the injector from the cooling jacket;
the liquid includes water;
an auger is in the basket for agitating contents of the basket;
brushes are in communication with the basket for maintaining the basket holes in an unobstructed configuration, the brushes being constructed of a non-static and non-sparking material; and
a removable tray is below the basket in the gas chamber for collecting dust passing through the basket.

16. The supercell of claim 1, wherein the liquid consists essentially of water.

17. The supercell of claim 1, wherein the liquid consists essentially of water and alcohol.

18. The supercell of claim 1, wherein the chamber outlet is a supercell outlet.

19. The supercell of claim 1, wherein the basket is angled from about 45 degrees to about 65 degrees from the horizon.

20. The supercell of claim 1, further comprising an auger in the basket for agitating contents of the basket.

21. The supercell of claim 1, further comprising brushes in communication with the basket for maintaining the basket holes in an unobstructed configuration, the brushes being constructed of a non-static and non-sparking material.

22. The supercell of claim 1, further comprising a radiator in communication with the gas chamber for cooling the gas chamber.

23. The supercell of claim 1, further comprising at least one heat sink in thermal communication with the gas chamber for cooling the gas chamber.

24. The supercell of claim 1, further comprising a removable tray below the basket in the gas chamber for collecting dust passing through the basket.

25. A method of producing acetylene, the method comprising the steps:
providing a carbide supercell, comprising:
an outer shell defining an interior gas chamber;
a rotating basket positioned in the gas chamber, the basket defining an open interior region and a plurality of holes and being configured to contain at least one calcium carbide rock in the open interior region;
an injector adjacent the basket for spraying a liquid including water into the open interior region of the basket;
a controller in data communication with the injector for actuating the injector;
a chamber outlet adjacent an upper end of the gas chamber; and
means for cooling a gas;
providing at least one calcium carbide rock in the open interior region of the basket;
rotating the basket;
having the injector spray the liquid into the open interior region of the basket to create a chemical reaction resulting in the production of acetylene gas and calcium hydroxide dust;
passing the calcium hydroxide dust through the basket holes to deposit substantially dry calcium hydroxide dust below the basket in the gas chamber;
cooling the acetylene gas using the means for cooling; and
passing the acetylene gas through the chamber outlet.

26. The method of claim 25, wherein the controller actuates the injector to have the injector spray the liquid.

27. The method of claim 26, wherein:
the controller is a controller that determines an amount of acetylene needed at a given time to power an internal combustion engine and controls the injection of acetylene in the engine; and
the controller actuates the injector in accordance with the amount of acetylene needed at the given time.

28. An internal combustion engine, comprising:
a cylinder having a fuel input device and an exhaust valve;
a controller in data communication with the fuel input device and the exhaust valve;
a piston located within the cylinder; and
a supercell having:
an outer shell defining an interior gas chamber;
a rotating basket positioned in the gas chamber, the basket defining an open interior region and a plurality of holes;
an injector adjacent the basket for spraying a liquid into the open interior region of the basket;
a chamber outlet adjacent an upper end of the gas chamber;
means for cooling gaseous acetylene;
wherein the chamber outlet is in communication with the fuel input device.

29. The engine of claim 28, wherein the controller is in data communication with the injector to actuate the injector in accordance with an amount of acetylene needed at a given time.

30. The engine of claim 28, further comprising a spark plug located within the cylinder.

* * * * *